United States Patent
Li et al.

(10) Patent No.: US 12,216,475 B2
(45) Date of Patent: Feb. 4, 2025

(54) AUTONOMOUS VEHICLE OBJECT CLASSIFIER METHOD AND SYSTEM

(71) Applicant: Honda Motor Co., Ltd., Tokyo (JP)

(72) Inventors: Jiachen Li, Albany, CA (US); Haiming Gang, San Jose, CA (US); Hengbo Ma, Albany, CA (US); Chiho Choi, San Jose, CA (US)

(73) Assignee: Honda Motor Co., Ltd., Tokyo (JP)

( * ) Notice: Subject to any disclaimer, the term of this patent is extended or adjusted under 35 U.S.C. 154(b) by 505 days.

(21) Appl. No.: 17/411,894

(22) Filed: Aug. 25, 2021

(65) Prior Publication Data
US 2022/0413507 A1    Dec. 29, 2022

Related U.S. Application Data (60) Provisional application No. 63/216,202, filed on Jun. 29, 2021.

(51) Int. Cl.
*G05D 1/00*    (2024.01)
*B60W 50/08*    (2020.01)
(Continued)

(52) U.S. Cl.
CPC .......... *G05D 1/0221* (2013.01); *B60W 50/08* (2013.01); *B60W 60/0027* (2020.02);
(Continued)

(58) Field of Classification Search
CPC ... B60W 50/08; B60W 60/0027; G01S 17/86; G01S 17/89; G01S 17/931; G01S 7/4808;
(Continued)

(56) References Cited

U.S. PATENT DOCUMENTS 11,436,504 B1 *    9/2022    Lukarski ............... G06N 5/04
11,537,819 B1 *    12/2022   Das ....................... G06F 18/24
(Continued)

OTHER PUBLICATIONS

Penghao Zhou and Mingmin Chi. Relation parsing neural network for human-object interaction detection. In Proceedings of the IEEE/CVF International Conference on Computer Vision, pp. 843-851, 2019.
(Continued)

*Primary Examiner* — Kenny A Cese
(74) *Attorney, Agent, or Firm* — Rankin, Hill & Clark LLP (57) ABSTRACT

Object identification may be provided herein. A feature extractor may extract a first set of visual features, extract a second set of visual features, concatenate the first set of visual features, the second set of visual features, and a set of bounding box information, determine a number of object features and a global feature for a scene, and receive ego-vehicle feature information associated with an ego-vehicle. An object classifier may receive the number of object features, the global feature, and the ego-vehicle feature information, generate relational features with respect to relationships between each of the number of objects from the scene, and classify each of the number of objects from the scene based on the number of object features, the relational features, the global feature, the ego-vehicle feature information, and an intention of the ego-vehicle.

18 Claims, 6 Drawing Sheets

(51) Int. Cl.

| | |
|---|---|
| *B60W 60/00* | (2020.01) |
| *G01S 17/89* | (2020.01) |
| *G01S 17/931* | (2020.01) |
| *G06F 18/2433* | (2023.01) |
| *G06F 18/25* | (2023.01) |
| *G06V 10/44* | (2022.01) |
| *G06V 10/46* | (2022.01) |
| *G06V 10/80* | (2022.01) |
| *G06V 20/58* | (2022.01) |

(52) U.S. Cl.
CPC .......... *G01S 17/89* (2013.01); *G06F 18/2433* (2023.01); *G06V 10/462* (2022.01); *G06V 20/58* (2022.01); *G01S 17/931* (2020.01); *G06F 18/253* (2023.01); *G06V 10/454* (2022.01); *G06V 10/806* (2022.01)

(58) Field of Classification Search
CPC ... G05D 1/0221; G06F 18/24; G06F 18/2433; G06F 18/253; G06V 10/454; G06V 10/462; G06V 10/806; G06V 20/58
USPC .......................................................... 382/103
See application file for complete search history.

(56) References Cited

U.S. PATENT DOCUMENTS

| | | | | |
|---|---|---|---|---|
| 2018/0334108 | A1* | 11/2018 | Rötzer | G03B 37/04 |
| 2019/0147610 | A1* | 5/2019 | Frossard | G06N 3/045 |
| | | | | 382/103 |
| 2020/0394434 | A1* | 12/2020 | Rao | G06N 3/08 |
| 2022/0129684 | A1* | 4/2022 | Saranin | G06F 18/23 |
| 2022/0327318 | A1* | 10/2022 | Radhakrishnan ... | G06F 18/2411 |
| 2022/0358401 | A1* | 11/2022 | Kang | G06F 11/0793 |
| 2022/0366175 | A1* | 11/2022 | Yu | B60W 60/001 |
| 2022/0388535 | A1* | 12/2022 | Singh | G06V 10/82 |

OTHER PUBLICATIONS

Yi Zhou, Xiaodong He, Lei Huang, Li Liu, Fan Zhu, Shanshan Cui, and Ling Shao. Collaborative learning of semi-supervised segmentation and classification for medical images. In Proceedings of the IEEE/CVF Conference on Computer Vision and Pattern Recognition, pp. 2079-2088, 2019.

Ekrem Aksoy, Ahmet Yazci, and Mahmut Kasap. See, attend and brake: An attention-based saliency map prediction model for end-to-end driving. arXiv preprint arXiv:2002.11020, 2020.

Ferran Alet, EricaWeng, Tomas Lozano-Perez, and Leslie Pack Kaelbling. Neural relational inference with fast modular meta-learning. In Advances in Neural Information Processing Systems, pp. 11804-11815, 2019.

Peter Anderson, Xiaodong He, Chris Buehler, Damien Teney, Mark Johnson, Stephen Gould, and Lei Zhang. Bottom-up and top-down attention for image captioning and visual question answering. In Proceedings of the IEEE conference on computer vision and pattern recognition, pp. 6077-6086, 2018.

Peter Battaglia, Razvan Pascanu, Matthew Lai, Danilo Jimenez Rezende, et al. Interaction networks for learning about objects, relations and physics. In Advances in neural information processing systems, pp. 4502-4510, 2016.

Peter W Battaglia, Jessica B Hamrick, Victor Bapst, Alvaro Sanchez-Gonzalez, Vinicius Zambaldi, Mateusz Malinowski, Andrea Tacchetti, David Raposo, Adam Santoro, Ryan Faulkner, et al. Relational inductive biases, deep learning, and graph networks. arXiv preprint arXiv:1806.01261, 2018.

David Berthelot, Nicholas Carlini, Ian Goodfellow, Nicolas Papernot, Avital Oliver, and Colin Raffel. Mixmatch: A holistic approach to semi-supervised learning. arXiv preprint arXiv:1905.02249, 2019.

Manjot Bilkhu, Siyang Wang, and Tushar Dobhal. Attention is all you need for videos: Self-attention based video summarization using universal transformers. arXiv preprint arXiv:1906.02792, 2019.

Holger Caesar, Varun Bankiti, Alex H Lang, Sourabh Vora, Venice Erin Liong, Qiang Xu, Anush Krishnan, Yu Pan, Giancarlo Baldan, and Oscar Beijbom. nuscenes: A multimodal dataset for autonomous driving. In Proceedings of the IEEE/CVF conference on computer vision and pattern recognition, pp. 11621-11631, 2020.

C. Chen, S. Hu, P. Nikdel, G. Mori, and M. Savva. Relational graph learning for crowd navigation. In 2020 IEEE/RSJ International Conference on Intelligent Robots and Systems (IROS), pp. 10007-10013, 2020.

Liang-Chieh Chen, George Papandreou, Florian Schroff, and Hartwig Adam. Rethinking atrous convolution for semantic image segmentation. arXiv preprint arXiv:1706.05587, 2017.

Chiho Choi, Joon Hee Choi, Jiachen Li, and Srikanth Malla. Shared cross-modal trajectory prediction for autonomous driving. arXiv preprint arXiv:2011.08436, 2020.

Luca Cultrera, Lorenzo Seidenari, Federico Becattini, Pietro Pala, and Alberto Del Bimbo. Explaining autonomous driving by learning end-to-end visual attention. In Proceedings of the IEEE/CVF Conference on Computer Vision and Pattern Recognition Workshops, pp. 340-341, 2020.

Zihang Dai, Zhilin Yang, Fan Yang, William W Cohen, and Ruslan Salakhutdinov. Good semi-supervised learning that requires a bad gan. In Proceedings of the 31st International Conference on Neural Information Processing Systems, pp. 6513 6523, 2017.

Abhishek Das, Harsh Agrawal, Larry Zitnick, Devi Parikh, and Dhruv Batra. Human attention in visual question answering: Do humans and deep networks look at the same regions? Computer Vision and Image Understanding, 163:90-100, 2017.

Stuart Eiffert, Kunming Li, Mao Shan, Stewart Worrall, Salah Sukkarieh, and Eduardo Nebot. Probabilistic crowd gan: Multimodal pedestrian trajectory prediction using a graph vehicle-pedestrian attention network. IEEE Robotics and Automation Letters, 5(4):5026-5033, 2020.

Mingfei Gao, Ashish Tawari, and Sujitha Martin. Goal-oriented object importance estimation in on-road driving videos. In 2019 International Conference on Robotics and Automation (ICRA), pp. 5509-5515. IEEE, 2019.

William L Hamilton, Rex Ying, and Jure Leskovec. Inductive representation learning on large graphs. In Proceedings of the 31st International Conference on Neural Information Processing Systems, pp. 1025-1035, 2017.

Kaiming He, Xiangyu Zhang, Shaoqing Ren, and Jian Sun. Deep residual learning for image recognition. In Proceedings of the IEEE conference on computer vision and pattern recognition, pp. 770-778, 2016.

Kaiming He, Georgia Gkioxari, Piotr Dollar, and Ross Girshick. Mask r-cnn, 2018.

Fa-Ting Hong, Wei-Hong Li, and Wei-Shi Zheng. Learning to detect important people in unlabelled images for semi-supervised important people detection. In Proceedings of the IEEE/CVF Conference on Computer Vision and Pattern Recognition, pp. 4146-4154, 2020.

Han Hu, Jiayuan Gu, Zheng Zhang, Jifeng Dai, and Yichen Wei. Relation networks for object detection. In Proceedings of the IEEE Conference on Computer Vision and Pattern Recognition, pp. 3588-3597, 2018.

Ahmet Iscen, Giorgos Tolias, Yannis Avrithis, and Ondrej Chum. Label propagation for deep semi-supervised learning. In Proceedings of the IEEE/CVF Conference on Computer Vision and Pattern Recognition, pp. 5070-5079, 2019.

Eric Jang, Shixiang Gu, and Ben Poole. Categorical reparameterization with gumbel-softmax. arXiv preprint arXiv:1611.01144, 2016.

Longlong Jing, Toufiq Parag, Zhe Wu, Yingli Tian, and Hongcheng Wang. Videossl: Semi-supervised learning for video classification. In Proceedings of the IEEE/CVF Winter Conference on Applications of Computer Vision, pp. 1110-1119, 2021.

Jinkyu Kim and John Canny. Interpretable learning for self-driving cars by visualizing causal attention. In Proceedings of the IEEE international conference on computer vision, pp. 2942-2950, 2017.

(56) References Cited

OTHER PUBLICATIONS

Diederik P. Kingma, Danilo J Rezende, Shakir Mohamed, and Max Welling. Semi-supervised learning with deep generative models. In Proceedings of the 27th International Conference on Neural Information Processing Systems—vol. 2, pp. 3581-3589, 2014.
Thomas Kipf, Ethan Fetaya, Kuan-Chieh Wang, Max Welling, and Richard Zemel. Neural relational inference for Interacting systems. In International Conference on Machine Learning, pp. 2688-2697, 2018.
Thomas N Kipf and Max Welling. Semi-supervised classification with graph convolutional networks. arXiv preprint arXiv:1609.02907, 2016.
Dong-Hyun Lee et al. Pseudo-label: The simple and efficient semi-supervised learning method for deep neural networks. In Workshop on challenges in representation learning, ICML, vol. 3, 2013.
C. Li, S. H. Chan, and Y. T. Chen. Who make drivers stop? towards driver-centric risk assessment: Risk object dentification via causal inference. In 2020 IEEE/RSJ International Conference on Intelligent Robots and Systems (IROS), pp. 10711-10718, 2020.
Jiachen Li, Hengbo Ma, Zhihao Zhang, and Masayoshi Tomizuka. Social-wagdat: Interaction-aware trajectory prediction via wasserstein graph double-attention network. arXiv preprint arXiv:2002.06241, 2020.
Jiachen Li, Fan Yang, Masayoshi Tomizuka, and Chiho Choi. Evolvegraph: Multi-agent trajectory prediction with dynamic relational reasoning. Advances in Neural Information Processing Systems, 33, 2020.
Wei-Hong Li, Fa-Ting Hong, and Wei-Shi Zheng. Learning to learn relation for important people detection in still images. In Proceedings of the IEEE/CVF Conference on Computer Vision and Pattern Recognition, pp. 5003-5011, 2019.
Tsung-Yi Lin, Piotr Dollar, Ross Girshick, Kaiming He, Bharath Hariharan, and Serge Belongie. Feature pyramid networks for object detection. In Proceedings of the IEEE Conference on Computer Vision and Pattern Recognition (CVPR), Jul. 2017.
Sujitha Martin, Sourabh Vora, Kevan Yuen, and Mohan Manubhai Trivedi. Dynamics of driver's gaze: Explorations in behavior modeling and maneuver prediction. IEEE Transactions on Intelligent Vehicles, 3 (2):141-150, 2018.
Avital Oliver, Augustus Odena, Colin A Raffel, Ekin Dogus Cubuk, and Ian Goodfellow. Realistic evaluation of deep semi-supervised learning algorithms. Advances in Neural Information Processing Systems, 31:3235-3246, 2018.
Yassine Ouali, Celine Hudelot, and Myriam Tami. An overview of deep semi-supervised learning. arXiv preprint arXiv:2006.05278, 2020.
Andrea 442 Palazzi, Davide Abati, Francesco Solera, Rita Cucchiara, et al. Predicting the driver's focus of attention: the dr (eye)ve project. IEEE transactions on pattern analysis and machine intelligence, 41(7): 1720-1733, 2018.
Abhishek Patil, Srikanth Malla, Haiming Gang, and Yi-Ting Chen. The h3d dataset for full-surround 3d multi-object detection and tracking in crowded urban scenes. In 2019 International Conference on Robotics and Automation (ICRA), pp. 9552-9557. IEEE, 2019.
Alvaro Sanchez-Gonzalez, Jonathan Godwin, Tobias Pfaff, Rex Ying, Jure Leskovec, and Peter Battaglia. Learning to simulate complex physics with graph networks. In International Conference on Machine Learning, pp. 8459-8468. PMLR, 2020.
Tom Silver, Rohan Chitnis, Aidan Curtis, Joshua Tenenbaum, Tomas Lozano-Perez, and Leslie Pack Kaelbling. Planning with learned object importance in large problem instances using graph neural networks. arXiv preprint arXiv:2009.05613, 2020.
Guolei Sun, Wenguan Wang, Jifeng Dai, and Luc Van Gool. Mining cross-image semantics for weakly supervised semantic segmentation. In European Conference on Computer Vision, pp. 347-365. Springer, 2020.
Antti Tarvainen and Harri Valpola. Mean teachers are better role models: Weight-averaged consistency targets improve semi-supervised deep learning results. In Proceedings of the 31st International Conference on Neural Information Processing Systems, pp. 1195-1204, 2017.
Petar Veličković, Guillem Cucurull, Arantxa Casanova, Adriana Romero, Pietro Lio, and Yoshua Bengio. Graph attention networks. arXiv preprint arXiv:1710.10903, 2017.
Anirudh Vemula, Katharina Muelling, and Jean Oh. Social attention: Modeling attention in human crowds. In 2018 IEEE international Conference on Robotics and Automation (ICRA), pp. 4601-4607. IEEE, 2018.
Wenguanwang, Jianbing Shen, Ruigang Yang, and Fatih Porikli. Saliency-aware video object segmentation. IEEE transactions on pattern analysis and machine intelligence, 40(1):20-33, 2017.
Xiaolong Wang, Ross Girshick, Abhinav Gupta, and Kaiming He. Non-local neural networks. In Proceedings of the IEEE Conference on Computer Vision and Pattern Recognition, pp. 7794-7803, 2018.
Zhou Yu, Jun Yu, Yuhao Cui, Dacheng Tao, and Qi Tian. Deep modular co-attention networks for visual question answering. In Proceedings of the IEEE/CVF Conference on Computer Vision and Pattern Recognition, pp. 6281-6290, 2019.
Vinicius Zambaldi, David Raposo, Adam Santoro, Victor Bapst, Yujia Li, Igor Babuschkin, Karl Tuyls, David Reichert, Timothy Lillicrap, Edward Lockhart, et al. Relational deep reinforcement learning. arXiv preprint arXiv:1806.01830, 2018.
Zehua Zhang, Ashish Tawari, Sujitha Martin, and David Crandall. Interaction graphs for object importance estimation in on-road driving videos. In 2020 IEEE International Conference on Robotics and Automation (ICRA), pp. 8920-8927. IEEE, 2020.

\* cited by examiner

AUTONOMOUS VEHICLE OBJECT CLASSIFIER METHOD AND SYSTEM

CROSS-REFERENCE TO RELATED APPLICATIONS

This application claims the benefit of U.S. Provisional Patent Application, Ser. No. 63/216,202 entitled "IMPORTANT OBJECT IDENTIFICATION WITH SEMI-SUPERVISED LEARNING FOR AUTONOMOUS DRIVING", filed on Jun. 29, 2021; the entirety of the above-noted application(s) is incorporated by reference herein.

BACKGROUND

The autonomous agents may navigate in complex, highly dynamic environments and may need to accurately identify the most relevant objects in a scene which are relevant to autonomous vehicle decision making and motion planning. In particular, autonomous vehicles should be able to figure out which dynamic objects (e.g., vehicles, pedestrians, cyclists) and static objects (e.g., traffic lights, stop signs) are relevant to perceive the environment, detect potential risks, and determine a current action, given specific intentions or goals. Typically, autonomous vehicles may have limited onboard computational resources, which may be allocated more efficiently on the perception and reasoning of the identified relevant objects, rather than on the classification. Onboard computational resources may also enable advanced driver-assistance systems to warn drivers about objects in certain situations or scenarios.

Existing related works may be divided into three main categories. First, some works focus on predicting the driver's gaze by imitating human drivers. The gaze information may be obtained by mounting a camera on the driver's head. However, most of these methods only provide pixel/region-level attention without indicating the relevance of each object/instance. Driver gaze tends to be sequential and limited to a single region at a certain moment, while there may be multiple relevant objects out of the focused region simultaneously. Moreover, human drivers may not always pay attention to the truly relevant objects, thus degrading the reliability of this information.

Second, some works attempt to train an attention-based model with specific tasks such as trajectory forecasting and end-to-end driving, in which there is no explicit supervision on the learned attention. Moreover, it is difficult to quantitatively evaluate the learned attention weights.

Third, some works attempt to identify relevant objects by providing explicit supervision on the object relevance with human annotations to inject human knowledge, in which the models are trained by standard supervised learning. However, these approaches demand a large amount of labeled data.

BRIEF DESCRIPTION

According to one aspect, a system for object identification may include a feature extractor and an object classifier. The feature extractor may extract a first set of visual features from a first image of a scene detected by a first sensor. The feature extractor may extract a second set of visual features from a second image of the scene detected by a second sensor of a different sensor type than the first sensor. The feature extractor may concatenate the first set of visual features, the second set of visual features, and a set of bounding box information associated with the first image and the second image. The feature extractor may determine a number of object features associated with a corresponding number of objects from the scene and a global feature for the scene. The feature extractor may receive ego-vehicle feature information associated with an ego-vehicle. The object classifier may receive the number of object features, the global feature, and the ego-vehicle feature information. The object classifier may generate relational features with respect to relationships between each of the number of objects from the scene. The object classifier may classify each of the number of objects from the scene based on the number of object features, the relational features, the global feature, the ego-vehicle feature information, and an intention of the ego-vehicle.

The ego-vehicle feature information associated with the ego-vehicle may include a position, a velocity, or an acceleration associated with the ego-vehicle. The feature extractor may sequence encode the first set of visual features, the second set of visual features, and the set of bounding box information prior to concatenation. The generating relational features by the object classifier with respect to relationships between each of the number of objects from the scene may be based on a fully-connected object relation graph. Each node may correspond to an object feature and each edge connecting two nodes represents a relationship between two objects associated with the two nodes.

The system for object identification for the ego-vehicle may include a task generator generating a task to be implemented via an autonomous controller and one or more vehicle systems based on the classification generated by the object classifier. The task generator may generate the task based on the classification generated by the object classifier, the ego-vehicle feature information, and the global feature. The task to be implemented may include an ego-vehicle action classifier and an ego-vehicle trajectory.

The object classifier may be trained utilizing supervised learning including a labeled dataset. The object classifier may be trained utilizing semi-supervised learning including a labeled dataset and an unlabeled dataset. The unlabeled dataset may be annotated with pseudo labels generated from classifying each of the number of objects. The first sensor may be an image capture sensor and the second sensor may be a light detection and ranging (LiDAR) sensor.

According to one aspect, a computer-implemented method for object identification may include extracting a first set of visual features from a first image of a scene detected by a first sensor, extracting a second set of visual features from a second image of the scene detected by a second sensor of a different sensor type than the first sensor, concatenating the first set of visual features, the second set of visual features, and a set of bounding box information associated with the first image and the second image, determining a number of object features associated with a corresponding number of objects from the scene and a global feature for the scene, receiving ego-vehicle feature information associated with an ego-vehicle, receiving the number of object features, the global feature, and the ego-vehicle feature information, generating relational features with respect to relationships between each of the number of objects from the scene, and classifying each of the number of objects from the scene based on the number of object features, the relational features, the global feature, the ego-vehicle feature information, and an intention of the ego-vehicle.

The ego-vehicle feature information associated with the ego-vehicle may include a position, a velocity, or an acceleration associated with the ego-vehicle. The method for object identification for the ego-vehicle may include sequence encoding the first set of visual features, the second set of visual features, and the set of bounding box information prior to concatenation. The method for object identification for the ego-vehicle may include generating the relational features based on a fully-connected object relation graph. Each node may correspond to an object feature and each edge connecting two nodes represents a relationship between two objects associated with the two nodes.

The method for object identification for the ego-vehicle may include generating a task to be implemented via an autonomous controller and one or more vehicle systems based on the classifying of each of the number of objects to a class of relevant or non-relevant. The method for object identification for the ego-vehicle may include generating the task based on the classifying each of the number of objects, the ego-vehicle feature information, and the global feature. The task to be implemented may include an ego-vehicle action classifier and an ego-vehicle trajectory.

The method for object identification for the ego-vehicle may include training the object classifier utilizing supervised learning including a labeled dataset. The method for object identification for the ego-vehicle may include training the object classifier utilizing semi-supervised learning including a labeled dataset and an unlabeled dataset, the unlabeled dataset may be annotated with pseudo labels generated from classifying each of the number of objects.

According to one aspect, a system for object identification may include a feature extractor, an object classifier, a task generator, and an autonomous controller. The feature extractor may extract a first set of visual features from a first image of a scene detected by a first sensor. The feature extractor may extract a second set of visual features from a second image of the scene detected by a second sensor of a different sensor type than the first sensor. The feature extractor may concatenate the first set of visual features, the second set of visual features, and a set of bounding box information associated with the first image and the second image. The feature extractor may determine a number of object features associated with a corresponding number of objects from the scene and a global feature for the scene. The feature extractor may receive ego-vehicle feature information associated with an ego-vehicle. The object classifier may receive the number of object features, the global feature, and the ego-vehicle feature information. The object classifier may generate relational features with respect to relationships between each of the number of objects from the scene. The object classifier may classify each of the number of objects from the scene based on the number of object features, the relational features, the global feature, the ego-vehicle feature information, and an intention of the ego-vehicle. The task generator may generate a task to be implemented based on the classification generated by the object classifier. The autonomous controller may implement the task by driving one or more vehicle systems to execute the task.

DETAILED DESCRIPTION

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "mobile device", as used herein, may be a computing device typically having a display screen with a user input (e.g., touch, keyboard) and a processor for computing. Mobile devices include handheld devices, portable electronic devices, smart phones, laptops, tablets, and e-readers.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system", as used herein, may be any automatic or manual systems that may be used to enhance the vehicle, driving, and/or safety. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, CAN bus system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

Accurate identification of relevant objects in a scene may be useful for high-quality decision making and motion planning of intelligent agents (e.g., autonomous vehicles) that navigate in complex and dynamic environments. Most existing approaches attempt to employ attention mechanisms to learn relevance or importance weights associated with each object indirectly via various tasks (e.g., trajectory prediction), which do not enforce direct supervision on the relevance estimation. According to one aspect, a system for object identification may tackle this task in an explicit way and formulate the task as a binary classification ("relevant" or "non-relevant") problem. In this way, a novel approach for relevant object identification in egocentric driving scenarios with relational reasoning on the objects in the scene may be provided.

The system for object identification may formulate a learning object relevance from human-labeled data as a binary classification problem, where each object is classified as relevant (e.g., '1') or non-relevant (e.g., '0'). However, since the relevance of a certain object is not entirely independent from others (e.g., the relevance of a certain object may decrease given the existence of another object), it may be useful or helpful to reason about the relation among entities before any final classification. Therefore, the system for object identification may leverage a graph representation and message passing operations to extract relational features, as will be described in greater detail below.

Further, since human annotations may be expensive or difficult to obtain, a semi-supervised learning pipeline may be implemented to enable the model to learn from unlimited unlabeled data. Explained yet again, the system for object identification may utilize semi-supervised learning techniques to reduce human efforts and enable the model to learn an unlimited amount of unlabeled data. Different from which only consider dynamic traffic participants, the system for object identification may also consider traffic lights or signs in the driving scenes to enable semantic reasoning of the environment. The system for object identification may employ a modified semi-supervised learning algorithm with a ranking-based strategy for pseudo-label generation to enable the model to learn from unlabeled datasets in addition to a human-labeled dataset. The system may also apply a modified semi-supervised learning algorithm to relevant object, people, or individual identification for autonomous driving.

With regard to Semi-Supervised Learning (SSL), learning from partially labeled data has emerged as a research direction in deep learning, especially in classification problems. SSL enables models to effectively learn from a labeled data together with an unlimited amount of unlabeled data, thereby reducing the efforts of human annotation and enlarging learning resources. SSL methods may be divided into the following categories: consistency regularization, proxy-label methods, generative models, and graph-based methods. However, these SSL methods were primarily proposed for the standard classification tasks where the object instances are classified independently without considering their relations. A modified strategy for pseudo-label generation and reason about the relations between objects may be implemented to incorporate object classification where object instances are classified while considering their relationships with one another.

In this regard, relational reasoning and graph neural networks may be utilized by the system for object identification to identify relevant individuals or objects in a given scene, where the model also learns to recognize their relations or relationships. Relational reasoning on a group of entities may have a wide range of applications such as trajectory forecasting, interaction detection, object detection, dynamics modeling, human-robot interaction. Further, graph neural networks have attracted significantly increasing research efforts in various fields, which are suitable for tackling relation modeling and extraction. Therefore, the system for object identification may employ a graph neural network to model the relations among objects in scenes (e.g., driving scenes), which provides the advantage or benefit of improving the performance of relevant object identification.

The system for object identification may leverage the auxiliary tasks of ego-vehicle behavior prediction to further improve the accuracy of relevance estimation or provide additional supervision signals.

Moreover, since the behavior of an ego-vehicle may be influenced by one or more relevant objects, the system for object identification may provide helpful cues for relevant object identification. For example, if the ego-vehicle is waiting before a green light, there is likely at least one relevant object which prevents the ego-vehicle from moving forward. The system for object identification may use auxiliary tasks associated with ego behavior prediction to provide additional supervision signals for the importance or relevance classification. Equipped with the auxiliary branches, the framework of the system for object identification may identify relevant objects in the scene and infer the ego behavior in a simultaneous fashion.

Figure 1:
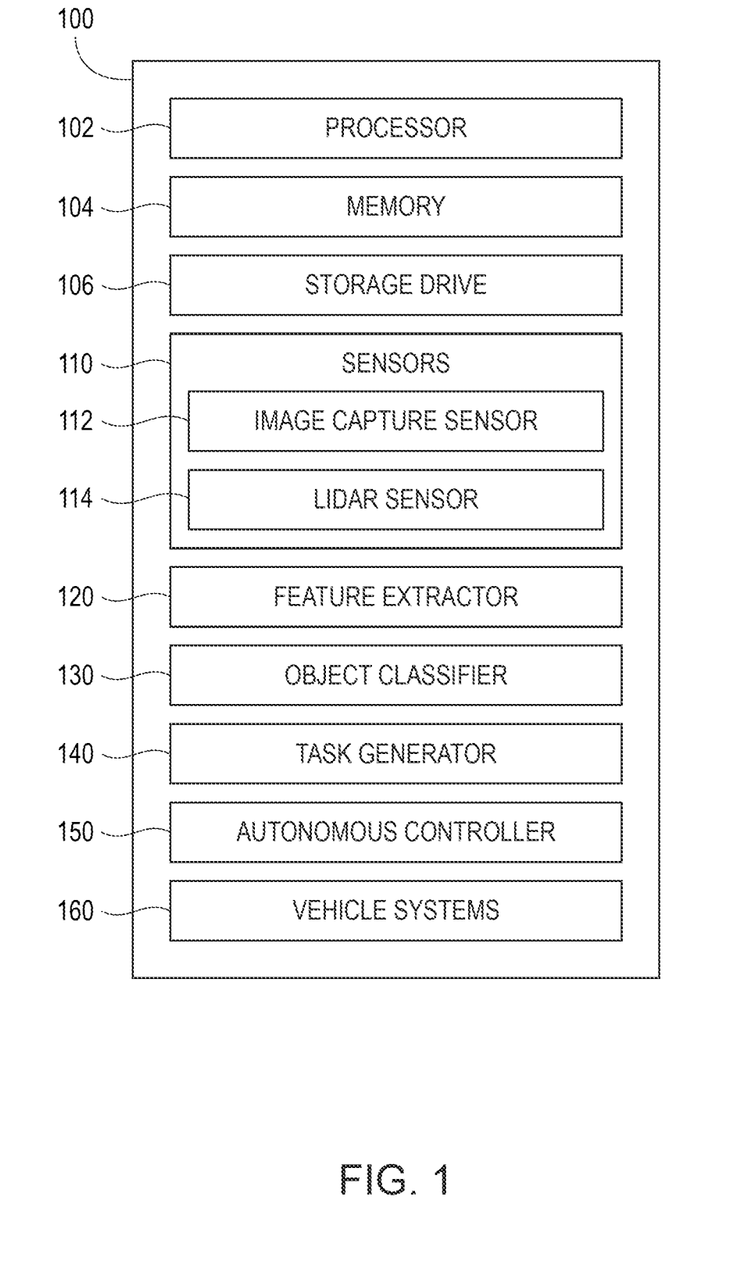
FIG. 1 is an exemplary component diagram of a system for object identification, according to one aspect.

FIG. 1 is an exemplary component diagram of a system for object identification, according to one aspect. According to one aspect, a task or goal associated with the system or method for object identification may be identifying relevant objects and an exemplary application domain may be autonomous driving or vehicle operation, for example. The system for object identification may receive, as an input, one or more images or point cloud images from different sensors, and provide an output of a binary classification for one or more objects detected within the image or point cloud scene. An object may be considered 'relevant' or 'important' if the object is within a scenario, such as a driving scenario, and may or should influence the behavior of an autonomous vehicle operating within the driving scenario. An example of a driving scenario may be a scenario where the autonomous vehicle is navigating through an intersection, and may determine or detect one or more surrounding objects, such as other vehicles or pedestrians, and label or classify these detected objects as relevant or non-relevant (e.g., important or non-important).

The system for object identification of FIG. 1 may include a processor 102, a memory 104, a storage drive 106, one or more sensors 110, such as an image capture sensor 112 or light detection and ranging (LiDAR) sensor 114, a feature extractor 120 (e.g., deep feature extractor), an object classifier 130, a task generator 140, an autonomous controller 150, and one or more vehicle systems 160. The feature extractor 120, the object classifier 130, and the task generator 140 may be implemented via the processor 102, the memory 104, and/or the storage drive 106. Respective components of the system for object identification (e.g., the processor 102, the memory 104, the storage drive 106, the one or more sensors 110, the image capture sensor 112 or the LiDAR sensor 114, the feature extractor 120, the object classifier 130, the task generator 140, the autonomous controller 150, etc. may be operably connected and/or in computer communication via a bus, such as a CAN bus, for example.

In any event, in FIG. 1, it may be seen that there are the feature extractor 120, the object classifier 130, and the task generator 140. The feature extractor 120 may include one or more deep neural networks to extract one or more features detected from the observation of one or more of the images or one or more of the point cloud inputs which may be observed or detected by the sensors 110 (e.g., receiving or generating a sensor measurement from the scene of the driving scenario).

The feature extractor 120 may extract object features from frontal-view visual observations and the ego-vehicle state information. In this regard, if the sensor 110 includes the image capture device 112 or image capture sensor, the measurement from the image capture sensor 112 may be an RGB image, for example. According to another aspect, if the sensor includes the LiDAR sensor 114, the measurement from the LiDAR sensor 114 may be a point cloud. Thus, the first sensor may be an image capture sensor 112 and the second sensor may be the LiDAR sensor 114. Additionally, the sensors 110, such as the image capture sensor 112 and the LiDAR sensor 112 may be mounted on the ego-vehicle and may be forward-facing or side-facing, according to one aspect.

Further, information from the ego-vehicle may be provided from one or more vehicle systems 160, such as the CAN bus or internal measurement units (IMUs), for example. The ego-vehicle feature information associated with the ego-vehicle may include a position, a velocity, or an acceleration associated with the ego-vehicle.

The object classifier 130 may receive extracted feature embeddings and reason about relations between the objects in the scene and identify the relevant ones. The task generator 140 may enhance relevant object identification by providing additional supervision for tasks. The system for object identification may employ a modified semi-supervised learning algorithm to enable the model to learn from a combination of labeled and unlabeled dataset, which may achieve better performance compared to standard supervised learning on the labeled dataset. The details of each component or aspect of the system are described in greater detail herein.

Figure 2A:
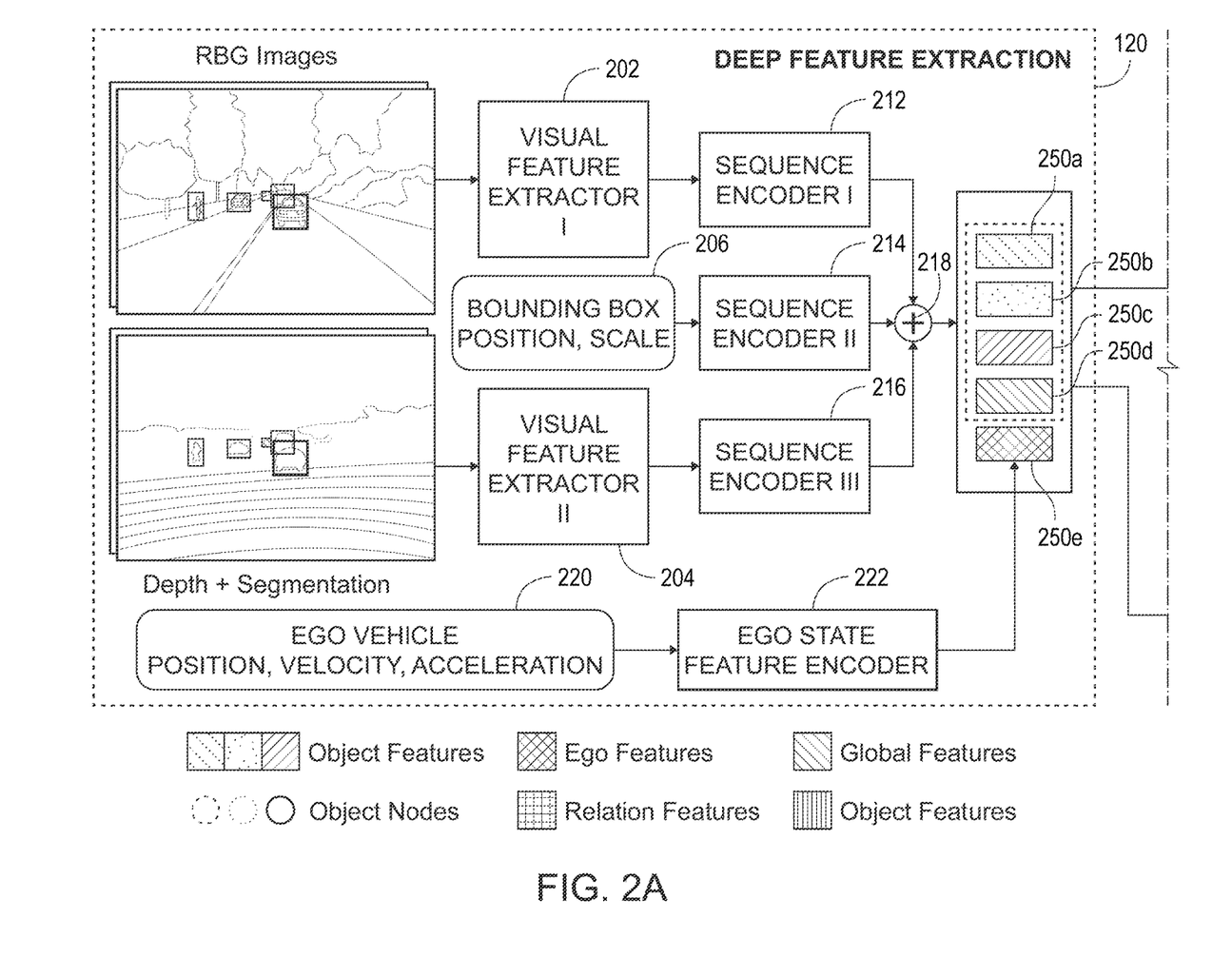
FIGS. 2A-2B are exemplary component diagrams of a system for object identification, according to one aspect.
Figure 2B:
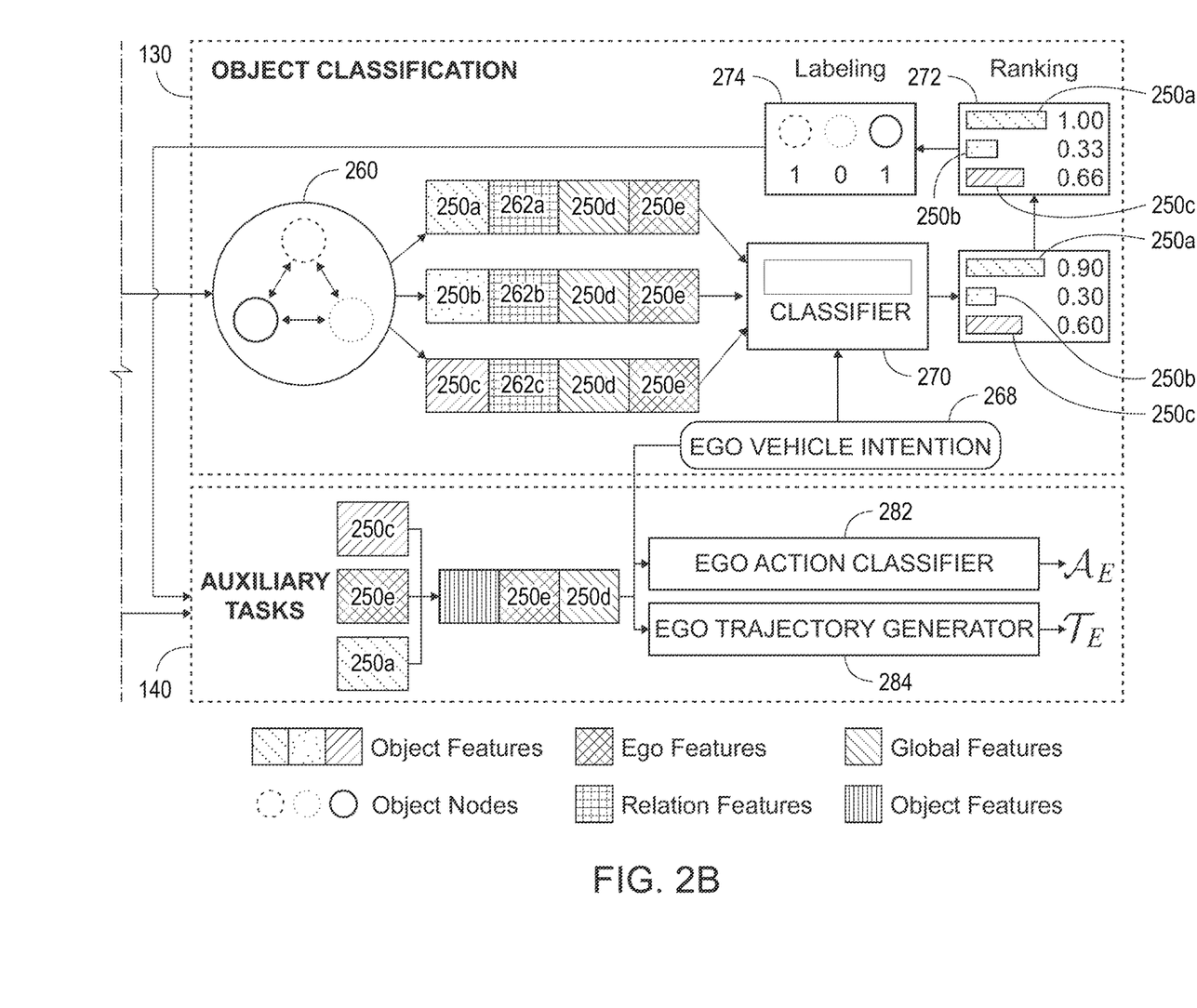

FIGS. 2A-2B are exemplary component diagrams of a system for object identification, according to one aspect, and object identification is described in greater detail herein.

Problem Formulation

The relevant object identification may be formulated by the system as a binary classification problem with a semi-supervised learning pipeline. Consider a labeled egocentric driving dataset that contains $|\mathcal{L}|$ labeled frontal image sequences $\mathcal{L}=\{l_{i,t}^{\mathcal{L}}\ i=1,\ldots,|\mathcal{L}|, t=-T_h+1,\ldots,0\}$, where for image sequence $l_{i,t}^{\mathcal{L}}$ there are $N_i^{\mathcal{L}}$ detected objects $\{x_j^{\mathcal{L}}, j=1,\ldots,N_i^{\mathcal{L}}\}$ at the current frame t=0 and the corresponding relevance labels $y_j^{\mathcal{L}}$. The system for object identification may set $y_j^{\mathcal{L}}=1$ for the "relevant" class and $y_j^{\mathcal{L}}=0$ for "non-relevant" class. The system for object identification may have a set of unlabeled frontal image sequences $\{U=I_{i,t}^U, i=1,\ldots,|U|, t=-T_h+1,\ldots,0\}$, where for image sequence $I_{i,t}^U$ there are $N_i^U$ detected objects $\{x_j^U, j=1,\ldots,N_i^U\}$ at the current frame t=0 without relevance labels. One aim may be to design a relevance classification model $\hat{y}=f_\theta(x_j)$ where $x_j \in I_{i,0}$ to learn from the augmented training set $\mathcal{L} \cup U$. In other words, the system for object identification may monitor objects existing at the current frame, and the model $f_\theta$ takes in the information of all the detected objects and predicts their relevance with respect to the ego-vehicle. Besides, the system for object identification may have access to other onboard sensor measurements (e.g., point cloud, velocity, acceleration, yaw angle) and the current ego driving intention $I_E$ (e.g., going forward, turning left, turning right).

With reference to FIG. 2A, the feature extractor 120 may apply semantic segmentation to the images or the inputs from the sensors 110 and may generate a segmentation map based on the input images. Any known semantic segmentation technique may be utilized by the feature extractor 120 to determine which portions of the input image belong to which object. The feature extractor 120 may perform feature extraction on the image using a first visual feature extractor 202. The feature extractor 120 may perform feature extraction on the point cloud (e.g., depth image) using a second visual feature extractor 204, thereby resulting in a high-dimension array or a high-dimension matrix. In this way, the feature extractor 120 may extract a first set of visual features from a first image of a scene detected by a first sensor (e.g., image capture sensor 112) and may extract a second set of visual features from a second image of the scene detected by a second sensor (e.g., LiDAR sensor 114) of a different sensor type than the first sensor.

Thereafter, the feature extractor 120 may perform sequence encoding on the first set of visually extracted features using a first sequence encoder 212. In other words, the feature extractor 120 may sequence encode the first set of visual features, the second set of visual features, and the set of bounding box information 206 prior to concatenating the aforementioned information. The feature extractor 120 may perform sequence encoding on a set of bounding box, position, and scale information 206 associated with the inputs (e.g., image and/or point cloud) using a second sequence encoder 214. The feature extractor 120 may perform sequence encoding on the second set of visually extracted features using a third sequence encoder 216. The aforementioned sequence encoding may extract temporal information associated with the first set of visual features, the second set of visual features, or the set of bounding box information. The feature extractor 120 may concatenate, via a concatenator 218, the sequence encoded information from the first set of visually extracted features, the second set of visually extracted features, and the set of bounding box, position, and scale information, along with a set of ego-vehicle feature information. Explained yet another way, the feature extractor 120 may concatenate the first set of visual features, the second set of visual features, and a set of bounding box information associated with the first image and the second image. Further, the feature extractor 120 may determine a number of object features associated with a corresponding number of objects from the scene and a global feature for the scene.

As previously discussed, the set of ego-vehicle feature information may include information from the CAN bus of the ego-vehicle or from ego-vehicle IMUs which may be indicative of a state of the ego-vehicle. Thus, the feature extractor 120 may receive ego-vehicle feature information 220 associated with the ego-vehicle and encode the ego-vehicle feature information 220 utilizing an ego-state feature encoder 222. In this way, the feature extractor 120 may extract feature information utilizing feature extraction 202, 204 and extract temporal information utilizing sequence encoders 212, 214, 216, and concatenate the extracted temporal information along with the set of ego-vehicle feature information using the concatenator 218. According to one aspect, the set of bounding box, position, and scale information may be provided by human annotation. According to another aspect, the set of bounding box, position, and scale information may be provided by any known bounding box detection algorithm. The scale may refer to a width and a height of a bounding box.

As seen in FIG. 2A, an output of the feature extractor 120 may include feature information associated with a first object 250a, feature information associated with a second object 250b, feature information associated with a third object 250c, feature information associated with the image(s) as a whole 250d, and the set of ego-vehicle feature information 250e. Together, this information may be considered the output of the feature extractor 120, given the image from the first sensor 112, the image from the second sensor 114, and the ego-vehicle feature information 220.

Deep Feature Extraction

Explained in greater detail, the feature extractor 120 may assume that bounding boxes of objects (e.g., traffic participants, traffic lights, stop signs) in the driving videos or images may be obtained by a detection and tracking system in advance. One or more depth images may be obtained by projecting the point cloud to the frontal camera view. One or more segmentation maps may be obtained by applying DeepLabv3 to the RGB images. The depth images and segmentation maps may have the same size as the original RGB images, which may be concatenated along the channel axis. The state information 220 (e.g., position, velocity, acceleration) of the ego-vehicle may be obtained from the synchronized 3D LiDAR SLAM and the CAN bus (e.g., one of the vehicle systems 160) of the ego-vehicle.

VISUAL FEATURES: The visual features $v_{j,V}$ of a certain object may include appearance features $v_{j,A}$ extracted from RGB images, and depth or semantic features $v_{j,DS}$ extracted from depth images and semantic segmentation maps. The appearance features contain the information of both the appearance and the local context of objects. The system for object identification may adopt the ResNet101 pre-trained on the ImageNet dataset with Feature Pyramid Networks on top as the backbone of Visual Feature Extractor I 202 to obtain the features at all frames, which are fed into Sequence Encoder I to obtain the final features $V_{j,A}$. The system for object identification may use a Visual Feature Extractor II 204 (e.g., ResNet18) trained from scratch to extract the depth or semantic features from all frames, which may be fed into a Sequence Encoder III 216 to obtain the final features $v_{j,DS}$. To extract the feature of each object from $v_{j,A}$ and $v_{j,DS}$, an ROIAlign pooling layer may be added before feeding into the sequence encoder. The final visual feature of each object may be concatenated by $v_{j,V}=[v_{j,A}, v_{j,DS}]$ along a channel dimension. Similar procedures may be applied to extract a global context information from the whole image. The global feature may be denoted as $v_{global}=[v_{global,A}, v_{global,DS}]$.

BOUNDING BOX FEATURES: The location and scale of the object bounding box information 206 in the frontal-view images may provide additional indications of the size and relative positions of the objects with respect to the ego-vehicle, which may influence their relevance. In this regard, the system for object identification may represent this information by $$\left(\frac{x_{j,t}}{W}, \frac{y_{j,t}}{H}, \frac{w_{j,t}}{W}, \frac{h_{j,t}}{H}\right)$$

where $x_{j,t}$, $y_{j,t}$, $w_{j,t}$, and $h_{j,t}$ denote the center coordinate, width, and height of the bounding box, respectively. The stack of this vector along the time axes may be fed into Sequence Encoder II 214 to obtain the bounding box feature $V_{j,B}$.

EGO-VEHICLE FEATURES: The system for object identification may extract the ego-state features $v_{ego}$ from a sequence of state information 220 (e.g., position, velocity, acceleration) with the Ego-State Feature Encoder 222.

The object classifier 130 may receive the number of object features 250a, 250b, 250c, the global feature 250d, and the ego-vehicle feature information 250e. The object classifier 130 may generate relational features 262a, 262b, 262c with respect to relationships between each of the number of objects from the scene. For example, the object classifier 130 may generate relational with respect to relationships between each of the number of objects from the scene based on a fully-connected object relation graph 260. Each node may correspond to an object feature and each edge connecting two nodes may represent a relationship between two objects associated with the two nodes. Further, the object classifier 130 may concatenate the object feature 250a, 250b, or 250c, the corresponding relational feature for that object 262a, 262b, or 262c, the global feature 250d and the ego-vehicle feature 250e for each corresponding object to generate a complete feature or a combined feature.

The classifier 270 may classify each of the number of objects from the scene based on the number of object features 250a, 250b, 250c, the relational features 262a, 262b, 262c, the global feature 250d, the ego-vehicle feature information 250e, and an intention of the ego-vehicle 268 as relevant or non-relevant (e.g., important or non-important). According to one aspect, the classifier 270 may classify each of the number of objects from the scene based on the corresponding complete feature or combined feature for that object and the intention of the ego-vehicle.

For example, a complete or combined feature for the first object may include a concatenation of the first object feature 250a, the relation feature for the first object 262a, the global feature 250d, and the ego-vehicle feature information 250e. Similarly, a complete or combined feature for the second object may include a concatenation of the second object feature 250b, the relation feature for the second object 262b, the global feature 250d, and the ego-vehicle feature information 250e. Further, a complete or combined feature for the third object may include a concatenation of the third object feature 250c, the relation feature for the third object 262c, the global feature 250d, and the ego-vehicle feature information 250e.

An output of the classifier 270 may be a probability that the corresponding object (e.g., 250a, 250b, 250c) is relevant. For example, if the output of the classifier 270 for a given object (e.g., the first object 250a) is 0.9, this may mean that the probability that the given object is relevant or important is 90%. If the output of the classifier 270 for the second object 250b is 0.3, this may mean that the probability the second object is relevant or important is 30%. If the output of the classifier 270 for the third object 250c is 0.6, this may mean that the probability the third object is relevant or important is 60%.

The intention of the ego-vehicle may be some prerequisite knowledge or prior knowledge form the human driver or may be determined based on some planning algorithm, GPS (e.g., navigation command to turn left along a currently travelled route), received command (e.g., voice command to turn left), etc.

According to one aspect, the object classifier 130 may be trained utilizing supervised learning including a labeled dataset. For example, the object classifier 130 may be trained utilizing supervised learning including the labeled dataset. According to another aspect, the object classifier 130 may be trained utilizing semi-supervised learning including a labeled dataset and an unlabeled dataset. The unlabeled dataset may be annotated with pseudo labels generated from classifying each of the number of objects. For example, the object classifier 130 may be trained utilizing semi-supervised learning including the labeled dataset and the unlabeled dataset, which may be annotated with pseudo labels generated from classifying each of the number of objects. Thus, the output of the model or the object classifier 130 may be utilized to create an output prediction which may be utilized as a ground truth label (e.g., pseudo label). However, pseudo labels are not necessarily the direct output of the classifier. In this regard, the object classifier 130 may perform ranking and labeling prior to setting an output as a pseudo label.

Relevance Classification on Relation Graph

Explained in greater detail, after obtaining the ego-state features ($v_{ego}$), global features ($v_{global}$) and object features ($v_j$, $j=1, \ldots, N_i$) in the image sequence $I_i$, the object classifier 130 may construct a fully-connected object relation graph 260 where the node attributes are the corresponding object features. In order to model the mutual influence and relations among individuals, the object classifier 130 may apply a message passing mechanism over the graph, which includes of an edge update ($v \rightarrow e$) and a node update ($e \rightarrow v$):

$$v \rightarrow e: e_{jk} = f_e([v_j, v_k]), e \rightarrow v: \bar{v}_j = f_v(\Sigma_{j \neq k} e_{jk}) \quad (1)$$

where $e_{jk}$ is the edge attribute from the sender node k to the receiver node j, $\bar{v}_j$ is defined as the relation features of node j, and $f_e(\bullet)/f_v(\bullet)$ are the edge/node update functions (e.g., multi-layer perceptrons) which are shared across the whole graph. Note that the edges between the same pair of nodes with opposite directions may have different attributes since their mutual influence of object relevance may not be symmetric. The message passing procedure may be applied multiple times to model higher-order relations in the model. Since the relevance of a certain object with respect to the ego-vehicle at the current frame not only depends on its own state but also the global context, object relations, and the ego-vehicle intention, the object classifier 130 may generate a comprehensive object feature:

$$o_j = [v_j, \bar{v}_j, v_{global}, v_{ego}, I_E] \quad (2)$$

which may be fed into the classifier (e.g., multi-layer perceptron) to obtain a corresponding relevance score $s_j \in [0, 1]$ (e.g., the probability that the object is relevant). During training phase, $s_j$ may be used to compute loss directly for labeled objects and generate pseudo-labels for unlabeled ones. During testing phase, $s_i$ may be used to predict relevance by arg max($1-s_j$, $s_j$).

Again, the comprehensive object feature for the first object 250a may include a concatenation of the first object feature 250a, the relation feature for the first object 262a, the global feature 250d, and the ego-vehicle feature information 250e. The comprehensive object feature for the second object may include a concatenation of the second object feature 250b, the relation feature for the second object 262b, the global feature 250d, and the ego-vehicle feature information 250e. The comprehensive object feature for the third object may include a concatenation of the third object feature 250c, the relation feature for the third object 262c, the global feature 250d, and the ego-vehicle feature information 250e.

Ranking-Based Pseudo-Label Generation

Pseudo-label generation may be implemented in semi-supervised learning algorithms. In the task, a naive way may be to use the learned relevance classifier at the last iteration directly to assign pseudo labels for the objects in the unlabeled data samples by arg max(1−$s_j$, $s_j$). However, in many cases, only a small subset of objects are relevant, and the naive version of pseudo-label assignment may lead to a data imbalance issue (e.g., assigning a "non-relevant" label to all the objects) which may degrade the model performance.

In order to mitigate this problem, the object classifier 130 may adopt a modified ranking-based strategy using a ranker 272, which encourages the model to identify relative relevance. First, the object classifier 130 may label the objects with a raw relevance score $s_j$ larger than a threshold, such as $\alpha 1 = 0.8$, as relevant objects. Similarly, those with a raw relevance score $s_j$ smaller than the threshold $1-\alpha 1$ may be labeled as non-relevant objects. If all the objects in a certain case are labeled, there is no further operation and the data sample may be appended to the training set. Second, in order to consider the relative relevance of the rest objects, the object classifier 130 may calculate a set of ranking scores $\bar{s}_j$ via dividing the raw scores $s_j$ by their maximum. Then, the object classifier 130 may label the objects with a ranking score $\bar{s}_j$ greater than a threshold, such as $\alpha 2 = 0.8$ as relevant ones while the others may be labeled as non-relevant ones. This ranking strategy implemented via the ranker 272 may not only incorporate relational reasoning in the pseudo-label generation process via a labeler 274, but also mitigates the data imbalance issue. The system for object identification may denote the pseudo-label of object $x_j^U$ as $\tilde{y}_j^U$.

The task generator 140 may generate a task to be implemented via the autonomous controller 150 and one or more vehicle systems 160 based on the classification and/or labeling generated by the classifier 270 and the labeler 274. In other words, the task generator 140 may generate the task based on the classifying of each of the number of objects to a class of relevant or non-relevant. The autonomous controller 150 may implement the task by driving one or more vehicle systems 160 to execute the task. The task generator 140 may generate the task based on the classification generated by the object classifier 130 or the classifying each of the number of objects, the ego-vehicle feature information, and the global feature.

The task to be implemented may include an ego-vehicle action classifier and an ego-vehicle trajectory. In this regard, the ego-action classifier may classify or recognize a future, high-level, behavior of the ego-vehicle. For example, the future behavior may be stop, speed up, slow down, or maintain constant velocity. As the ego-action classifier may recognize the behavior of the ego-vehicle, this may benefit the relevant object identification task. Similarly, the ego-trajectory generator may classify or recognize a trajectory of the ego-vehicle at a lower level.

Auxiliary Tasks: Ego-Vehicle Behavior Prediction

Since the behavior of ego-vehicle may be affected by the existence of relevant objects, it could in turn enhance the identification of relevant objects. Therefore, the task generator 140 may predict the ego-vehicle behavior at two levels as parallel auxiliary tasks to provide additional supervision signals. Since the ego information is available without the requirement of human annotations, the auxiliary tasks may be trained by supervised learning with ground truth for both labeled and unlabeled datasets. First, the task generator 140 may predict the high-level action of the ego-vehicle $\mathcal{A}_E$ at the current frame with the Ego Action Classifier (EAC) 282, which may be formulated as a classification problem.

The ego actions may include stop, speed up, slow down or maintain a constant speed. The ground truth actions may be automatically obtained by setting thresholds on the speed and acceleration of the ego-vehicle. Second, the task generator 140 may also forecast the low-level trajectory of the ego-vehicle $\mathcal{T}_E$ in future time (e.g., future two seconds) with the Ego Trajectory Generator (ETG) 284, which may be formulated as a regression problem. The EAC 282 and ETG 284 may share the same input, which may include a feature embedding including the ego intention 268, ego-state features 250e, relevant object features 250a, 250c and global features 250d, while discarding the information of non-relevant objects 250b (e.g., due to the 0.30 probability from the classifier 270 for the second object 250b). In this way, the task generator 140 may generate the input for the EAC 282 and ETG 284 by concatenating the relevant object features 250a, 250c (e.g., determined as relevant for exceeding a pre-determined relevance threshold), the ego-state features 250e, and the global feature 250d. The intuition is that the ego behavior may merely be influenced by the relevant objects, which serves as a regularization to encourage the model to identify the correct ones.

If some relevant objects are mistakenly discarded, the predicted ego behavior may change accordingly which results in a discrepancy from the true behavior. The corresponding loss may help improve the relevance classifier. However, since hard assignment may be non-differentiable, the task generator 140 may employ the Gumbel-Softmax technique to obtain a gradient approximation for back-propagation. More formally, the system for object identification may denote the weight associated to object $x_j$ as $z_j$ which may be drawn as:

$$z_j = \frac{\exp\left(\frac{\log(s_j) + g_{j,1}}{\tau}\right)}{\exp\left((\log(s_j) + g_{j,1} + \tau\right) + \exp\left(\frac{\log(1-s_j) + g_{j,0}}{\tau}\right)} \quad (3)$$

where $g_j \in \mathbb{R}^2$ may be a vector of i.i.d. samples drawn from a Gumbel (0,1) distribution and $\tau$ may be the softmax temperature which controls the smoothness of samples. This distribution may converge to one-hot samples from the categorical distribution as $\tau \to 0$. Then the relevant object features $v_{imp}$ may be obtained by:

$$v_{imp} = \left(\frac{1}{N_i}\right)\sum_{j=1}^{N_i} z_j v_j \text{(training); or} \quad (4)$$

$$v_{imp} = \left(\frac{1}{\hat{N}_i}\right)\sum_{j=1}^{N_i} \operatorname{argmax}(1-s_j, s_j)_{v_j} \text{(testing)} \quad (4)$$

where $\hat{N}_i$ may be the total number of predicted relevant objects. The combined feature for ego behavior prediction $[v_{imp}, v_{ego}, v_{global}, I_E]$ may be used to predict the ego action $\mathcal{A}_E$ and trajectory $\mathcal{T}_E$.

Loss Function and Training

The proposed model may be trained either by supervised learning on the labeled dataset $\mathcal{L}$ or by semi-supervised learning on the combined (e.g., labeled and unlabeled) dataset $\mathcal{L}+U$. The former one may serve as an ablative baseline. The detailed loss functions and training procedures of both settings are elaborated below.

SUPERVISED LEARNING: The loss function $L_{SL}$ may include two parts: relevance classification loss $L_{imp}$ and auxiliary loss $L_{aux}$. The loss for supervised learning may be computed by:

$$L_{SL}^{\mathcal{L}} = L_{imp}^{\mathcal{L}} + \lambda L_{aux}^{\mathcal{L}} = -\left(\frac{1}{|\mathcal{L}|}\right)\sum_{k=1}^{|\mathcal{L}|}\left(\frac{1}{N_i^{\mathcal{L}}}\right)\sum_{j=1}^{N_i^{\mathcal{L}}} l_{CE}\left(y_j^{\mathcal{L}}, s_i^{\mathcal{L}}\right) + \quad (5)$$

$$\lambda\left(-1/|\mathcal{L}|\sum_{i=1}^{|\mathcal{L}|} l_{CE}(A_{E_i}), \hat{A}_{E_1}\right) + \beta\|T_{E_i} - \hat{T}_{E_i}\|^2$$

where $l_{CE}(\bullet,\bullet)$ denotes the binary cross-entropy (CE) loss. $\lambda$ and $\beta$ may be utilized to adjust the ratio between different loss terms.

SEMI-SUPERVISED LEARNING: The loss function $L_{SSL}$ may include two parts: labeled data loss $L^{\mathcal{L}}$ and unlabeled data loss $L^U$. The loss for SSL may be computed by:

$$L_{SSL} = L_{SL}^{\mathcal{L}} + \gamma L_{SL}^{U}, w_j = (\exp s_j^U)/\sum_{j=1}^{N_i^U} \exp s_j^U, \varepsilon_i = 1 - \frac{H(w)}{H(m)} \quad (6)$$

$$L_{SL}^U = 1/|U|\sum_{k=1}^{|U|} \varepsilon_i \sum_{j=1}^{N_i^U} w_j l_{MSE}(\hat{y}_j^U, s_j^U) + \quad (7)$$

$$\lambda\left(-\frac{1}{|U|\sum_{i=1}^{|U|} l_{CE}(A_{E_i}, \hat{A}_{E_i})} + \beta\|T_{E_i} - \hat{T}_{E_i}\|^2\right)$$

where $l_{MSE}(\bullet, \bullet)$ may denote the mean square error (MSE) loss, $\gamma$ may be used to balance the ratio between labeled and unlabeled data loss, $w=(w_1, \ldots w_{N_i}{}^U)$, $m=(1/N_i{}^U, \ldots, 1/N_i{}^U)$ with the same dimension as w, and $H(\bullet)$ may be the entropy function. $\varepsilon_i$ and $w_j$ may be the weights associated to i-th unlabeled data case and the j-th objects in a certain case, respectively. The weight $\gamma$ may be initialized as 0, which implies that the unlabeled dataset is not necessarily used at the beginning of training. It increases to a maximum value over a fixed number of epochs with a linear schedule since the model becomes more accurate and confident thus may generate more reliable pseudo-labels as training goes on. The effects of unlabeled dataset increases as the number of epochs becomes larger.

OBJECT WEIGHTING: The system for object identification may apply a weighting mechanism on the loss of each object based on the corresponding predicted relevance score $s_j{}^U$ to strengthen the effect of relevant ones while weaken that of non-relevant ones.

UNLABELED DATA WEIGHTING: One assumption associated with the task may be that a small subset of objects in the scene are significantly more relevant to the ego-vehicle than the others in most scenarios. In some situations, however, the model may predict vague and similar relevance scores for all the objects in unlabeled scenarios. Such cases contribute little to relevant object identification thus their effects should be weakened. More specifically, the system for object identification may obtain the weight $\varepsilon_i$ by leveraging the entropy function $H(\bullet)$ to indicate the similarity between relevance scores of different objects. A set of more similar scores may lead to a smaller weight associated with the corresponding training case.

Figure 3:
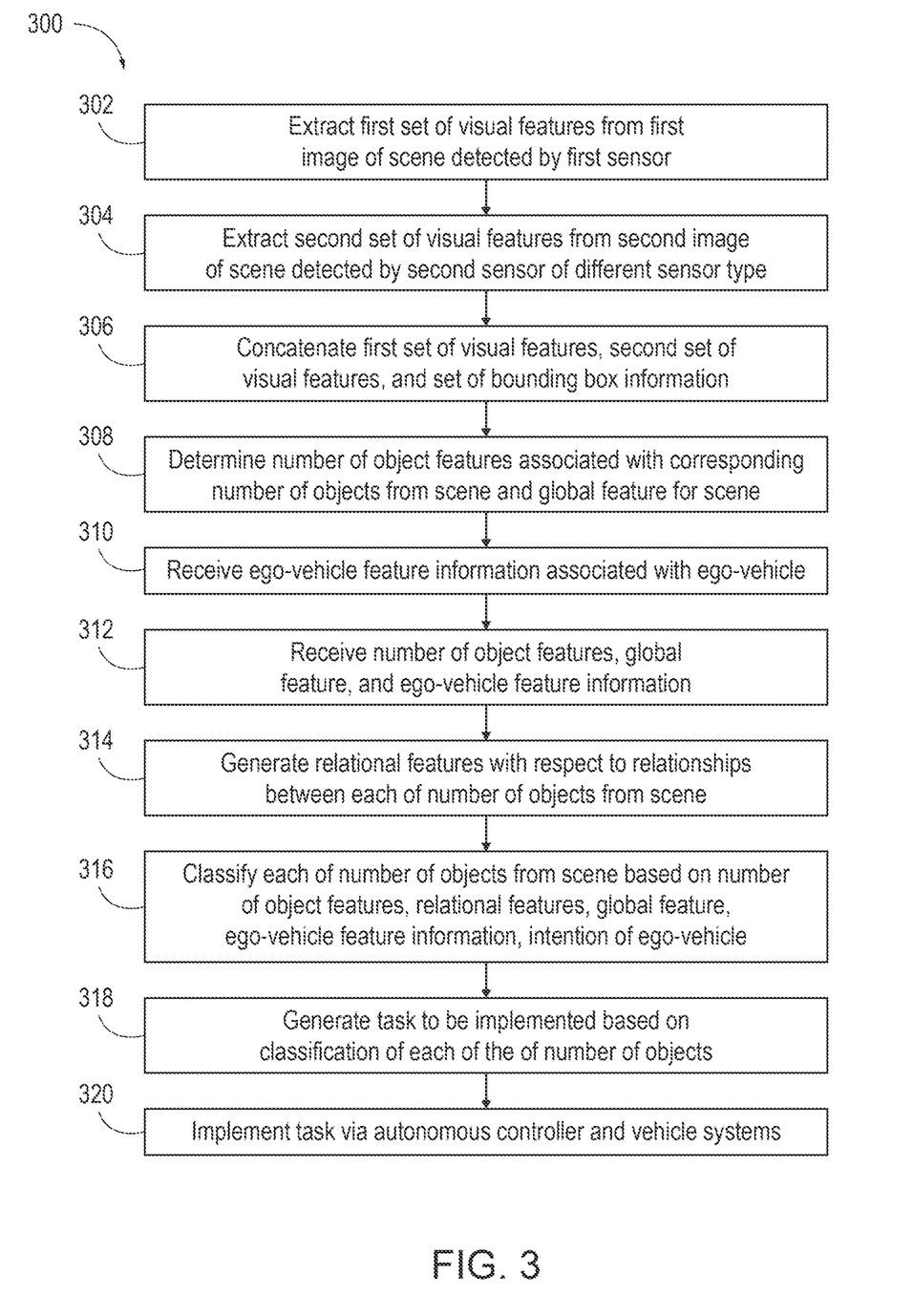
FIG. 3 is an exemplary flow diagram of a method for object identification, according to one aspect.

FIG. 3 is an exemplary flow diagram of a method for object identification, according to one aspect. A novel method for relevant object identification in the egocentric driving scenarios with relational reasoning on the objects in the scene may be provided. A computer-implemented method 300 for object identification may include extracting 302 a first set of visual features from a first image of a scene detected by a first sensor (e.g., image capture sensor 112), extracting 304 a second set of visual features from a second image of the scene detected by a second sensor (LiDAR sensor 114) of a different sensor type than the first sensor, concatenating 306 the first set of visual features, the second set of visual features, and a set of bounding box information associated with the first image and the second image, determining 308 a number of object features associated with a corresponding number of objects from the scene and a global feature for the scene, receiving 310 ego-vehicle feature information associated with an ego-vehicle, receiving 312 the number of object features, the global feature, and the ego-vehicle feature information, generating 314 relational features with respect to relationships between each of the number of objects from the scene, classifying 316 each of the number of objects from the scene based on the number of object features, the relational features, the global feature, the ego-vehicle feature information, and an intention of the ego-vehicle, generating 318 a task to be implemented based on classification of each of the of number of objects, and implementing 320 the task via an autonomous controller 150 and one or more vehicle systems 160.

Figure 4:
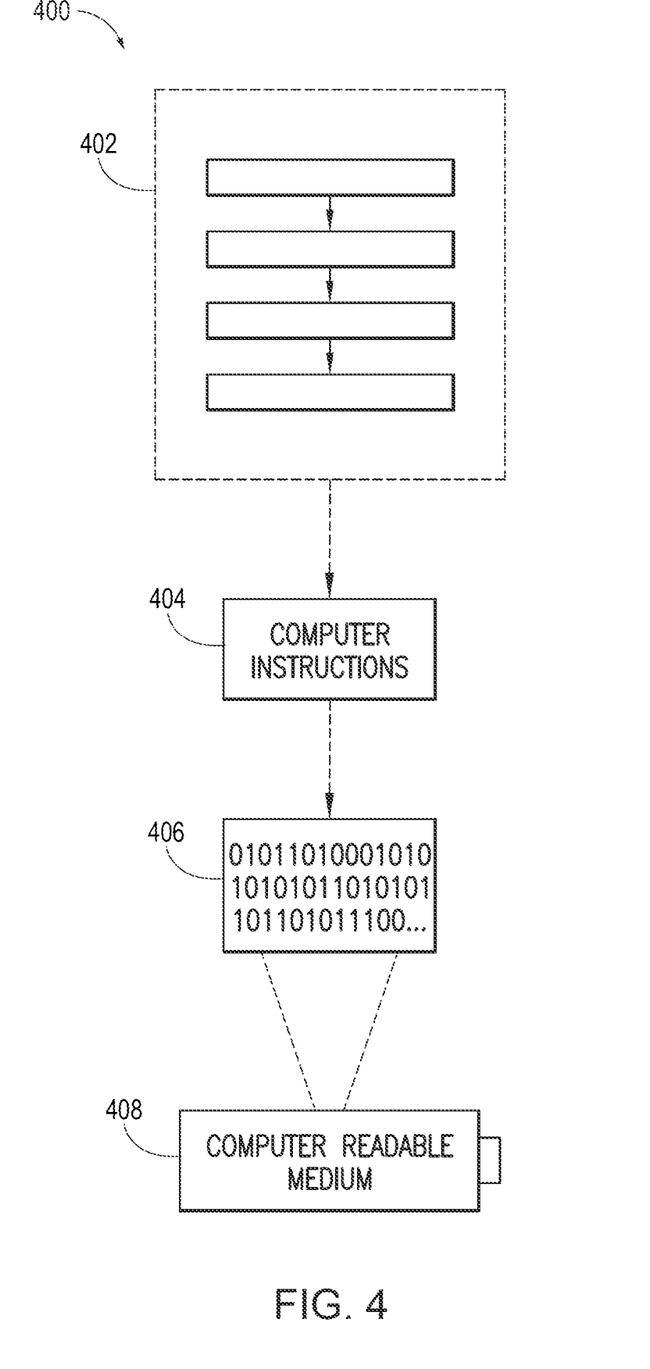
FIG. 4 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 4, wherein an implementation 400 includes a computer-readable medium 408, such as a CD-R, DVD-R, flash drive, a platter of a hard disk drive, among others, on which is encoded computer-readable data 406. This encoded computer-readable data 406, such as binary data including a plurality of zero's and one's as shown in 406, in turn includes a set of processor-executable computer instructions 404 configured to operate according to one or more of the principles set forth herein. In this implementation 400, the processor-executable computer instructions 404 may be configured to perform a method 402, such as the method 300 of FIG. 3. In another aspect, the processor-executable computer instructions 404 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 5:
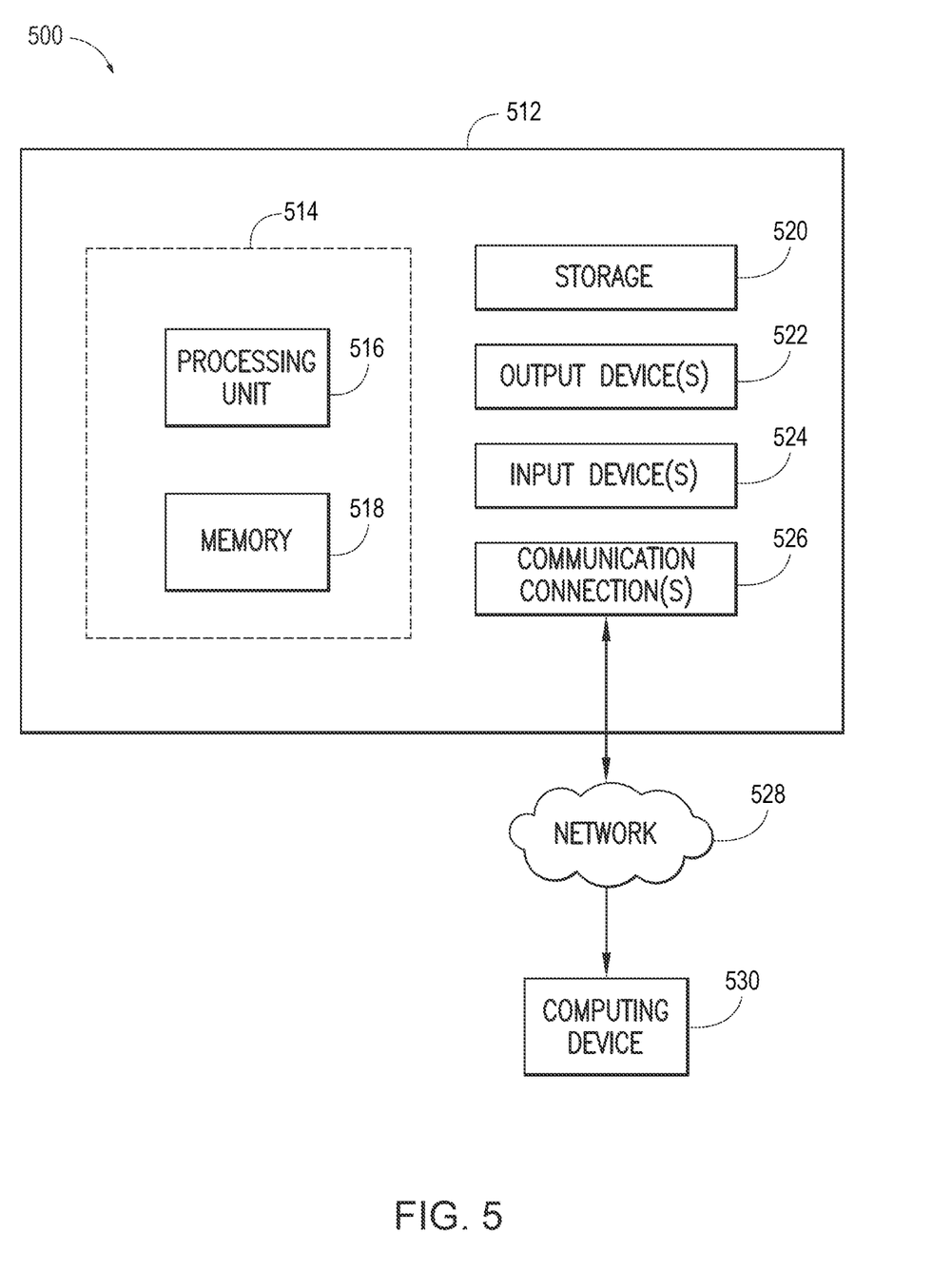
FIG. 5 is an illustration of an example computing environment where one or more of the provisions set forth herein are implemented, according to one aspect.

FIG. 5 and the following discussion provide a description of a suitable computing environment to implement aspects of one or more of the provisions set forth herein. The operating environment of FIG. 5 is merely one example of a suitable operating environment and is not intended to suggest any limitation as to the scope of use or functionality of the operating environment. Example computing devices include personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, among others.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 5 illustrates a system 500 including a computing device 512 configured to implement one aspect provided herein. In one configuration, the computing device 512 includes at least one processing unit 516 and memory 518. Depending on the exact configuration and type of computing device, memory 518 may be volatile, such as RAM, non-volatile, such as ROM, flash memory, or a combination thereof. This configuration is illustrated in FIG. 5 by dashed line 514.

In other aspects, the computing device 512 includes additional features or functionality. For example, the computing device 512 may include additional storage such as removable storage or non-removable storage, including magnetic storage, optical storage, among others. Such additional storage is illustrated in FIG. 5 by storage 520. In one aspect, computer readable instructions to implement one aspect provided herein are in storage 520. Storage 520 may store other computer readable instructions to implement an operating system, an application program, among others. Computer readable instructions may be loaded in memory 518 for execution by processing unit 516, for example.

The term "computer readable media" as used herein includes computer storage media. Computer storage media includes volatile and non-volatile, removable and non-removable media implemented in any method or technology for storage of information such as computer readable instructions or other data. Memory 518 and storage 520 are examples of computer storage media. Computer storage media includes RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 512. Any such computer storage media is part of the computing device 512.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 512 includes input device(s) 524 such as keyboard, mouse, pen, voice input device, touch input device, infrared cameras, video input devices, or any other input device. Output device(s) 522 such as one or more displays, speakers, printers, or any other output device may be included with the computing device 512. Input device(s) 524 and output device(s) 522 may be connected to the computing device 512 via a wired connection, wireless connection, or any combination thereof. In one aspect, an input device or an output device from another computing device may be used as input device(s) 524 or output device(s) 522 for the computing device 512. The computing device 512 may include communication connection(s) 526 to facilitate communications with one or more other devices 530, such as through network 528, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names for features, elements, items, etc. For example, a first channel and a second channel generally correspond to channel A and channel B or two different or two identical channels or the same channel. Additionally, "comprising", "comprises", "including", "includes", or the like means comprising or including, but not limited to.

It will be appreciated that various of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A system for object identification, comprising:
a feature extractor:
extracting a first set of visual features from a first image of a scene detected by a first sensor;
extracting a second set of visual features from a second image of the scene detected by a second sensor of a different sensor type than the first sensor;
concatenating the first set of visual features, the second set of visual features, and a set of bounding box information associated with the first image and the second image;

determining a number of object features associated with a corresponding number of objects other than an ego-vehicle from the scene and a global feature for the scene; and receiving ego-vehicle feature information associated with the ego-vehicle; and an object classifier:

receiving the number of object features, the global feature, and the ego-vehicle feature information;

generating relational features with respect to relationships between each of the number of objects from the scene, the relational features including a mutual influence between each of the number of objects from the scene;

classifying each of the number of objects from the scene as a binary classification of relevant or non-relevant to a behavior of the ego-vehicle, based on the number of object features, the relational features, the global feature, the ego-vehicle feature information, and an intention of the ego-vehicle; and labeling each of the number of objects from the scene as relevant or non-relevant to the behavior of the ego-vehicle, wherein the object classifier is trained utilizing semi-supervised learning including a labeled dataset and an unlabeled dataset, wherein the unlabeled dataset is annotated with pseudo labels generated from classifying each of the number of objects, the pseudo labels indicating each of the number of objects from the scene as relevant or non-relevant to the behavior of the ego-vehicle.

2. The system for object identification for the ego-vehicle of claim 1, wherein the ego-vehicle feature information associated with the ego-vehicle includes a position, a velocity, or an acceleration associated with the ego-vehicle.

3. The system for object identification for the ego-vehicle of claim 1, wherein the feature extractor sequence encodes the first set of visual features, the second set of visual features, and the set of bounding box information prior to concatenation.

4. The system for object identification for the ego-vehicle of claim 1, wherein the generating relational features with respect to relationships between each of the number of objects from the scene is based on a fully-connected object relation graph, wherein each node corresponds to an object feature and each edge connecting two nodes represents a relationship between two objects associated with the two nodes.

5. The system for object identification for the ego-vehicle of claim 1, comprising a task generator generating a task to be implemented via an autonomous controller and one or more vehicle systems using one or more of the number of object features associated with the corresponding number of objects from the scene classified as relevant to the behavior of the ego-vehicle, while discarding one or more of the number of object features associated with the corresponding number of objects from the scene classified as non-relevant to the behavior of the ego-vehicle.

6. The system for object identification for the ego-vehicle of claim 5, wherein the task generator generates the task based on one or more of the number of object features associated with the corresponding number of objects from the scene classified as relevant to the behavior of the ego-vehicle, the ego-vehicle feature information, and the global feature, while discarding one or more of the number of object features associated with the corresponding number of objects from the scene classified as non-relevant to the behavior of the ego-vehicle.

7. The system for object identification for the ego-vehicle of claim 5, wherein the task to be implemented includes an ego-vehicle action classifier and an ego-vehicle trajectory.

8. The system for object identification for the ego-vehicle of claim 1, wherein the object classifier is trained utilizing supervised learning including a labeled dataset.

9. The system for object identification for the ego-vehicle of claim 1, wherein the first sensor is an image capture sensor and the second sensor is a light detection and ranging (LiDAR) sensor.

10. A computer-implemented method for object identification, comprising:

extracting a first set of visual features from a first image of a scene detected by a first sensor;

extracting a second set of visual features from a second image of the scene detected by a second sensor of a different sensor type than the first sensor;

concatenating the first set of visual features, the second set of visual features, and a set of bounding box information associated with the first image and the second image;

determining a number of object features associated with a corresponding number of objects other than an ego-vehicle from the scene and a global feature for the scene;

receiving ego-vehicle feature information associated with the ego-vehicle;

receiving the number of object features, the global feature, and the ego-vehicle feature information;

generating relational features with respect to relationships between each of the number of objects from the scene, the relational features including a mutual influence between each of the number of objects from the scene;

classifying, by an object classifier, each of the number of objects from the scene as a binary classification of relevant or non-relevant to a behavior of the ego-vehicle, based on the number of object features, the relational features, the global feature, the ego-vehicle feature information, and an intention of the ego-vehicle; and labeling each of the number of objects from the scene as relevant or non-relevant to the behavior of the ego-vehicle, wherein the method further comprises training the object classifier utilizing semi-supervised learning including a labeled dataset and an unlabeled dataset, wherein the unlabeled dataset is annotated with pseudo labels generated from classifying each of the number of objects, the pseudo labels indicating each of the number of objects from the scene as relevant or non-relevant to the behavior of the ego-vehicle.

11. The method for object identification for the ego-vehicle of claim 10, wherein the ego-vehicle feature information associated with the ego-vehicle includes a position, a velocity, or an acceleration associated with the ego-vehicle.

12. The method for object identification for the ego-vehicle of claim 10, comprising sequence encoding the first set of visual features, the second set of visual features, and the set of bounding box information prior to concatenation.

13. The method for object identification for the ego-vehicle of claim 10, comprising generating the relational features based on a fully-connected object relation graph, wherein each node corresponds to an object feature and each edge connecting two nodes represents a relationship between two objects associated with the two nodes.

14. The method for object identification for the ego-vehicle of claim 10, comprising generating a task to be implemented via an autonomous controller and one or more vehicle systems using one or more of the number of object features associated with the corresponding number of objects from the scene classified as relevant to the behavior of the ego-vehicle, while discarding one or more of the number of object features associated with the corresponding number of objects from the scene classified as non-relevant to the behavior of the ego-vehicle.

15. The method for object identification for the ego-vehicle of claim 14, comprising generating the task based on one or more of the number of object features associated with the corresponding number of objects from the scene classified as relevant to the behavior of the ego-vehicle, the classifying each of the number of objects, the ego-vehicle feature information, and the global feature, while discarding one or more of the number of object features associated with the corresponding number of objects from the scene classified as non-relevant to the behavior of the ego-vehicle.

16. The method for object identification for the ego-vehicle of claim 14, wherein the task to be implemented includes an ego-vehicle action classifier and an ego-vehicle trajectory.

17. The method for object identification for the ego-vehicle of claim 10, comprising training the object classifier utilizing supervised learning including a labeled dataset.

18. A system for object identification, comprising:
a feature extractor:
extracting a first set of visual features from a first image of a scene detected by a first sensor;
extracting a second set of visual features from a second image of the scene detected by a second sensor of a different sensor type than the first sensor;
concatenating the first set of visual features, the second set of visual features, and a set of bounding box information associated with the first image and the second image;
determining a number of object features associated with a corresponding number of objects other than an ego-vehicle from the scene and a global feature for the scene; and
receiving ego-vehicle feature information associated with the ego-vehicle;
an object classifier:
receiving the number of object features, the global feature, and the ego-vehicle feature information;
generating relational features with respect to relationships between each of the number of objects from the scene, the relational features including a mutual influence between each of the number of objects from the scene;
classifying each of the number of objects from the scene as a binary classification of relevant or non-relevant to a behavior of the ego-vehicle, based on the number of object features, the relational features, the global feature, the ego-vehicle feature information, and an intention of the ego-vehicle; and
labeling each of the number of objects from the scene as relevant or non-relevant to the behavior of the ego-vehicle;
a task generator generating a task to be implemented using one or more of the number of object features associated with the corresponding number of objects from the scene classified as relevant to the behavior of the ego-vehicle, while discarding one or more of the number of object features associated with the corresponding number of objects from the scene classified as non-relevant to the behavior of the ego-vehicle; and
an autonomous controller implementing the task by driving one or more vehicle systems to execute the task,
wherein the object classifier is trained utilizing semi-supervised learning including a labeled dataset and an unlabeled dataset, wherein the unlabeled dataset is annotated with pseudo labels generated from classifying each of the number of objects, the pseudo labels indicating each of the number of objects from the scene as relevant or non-relevant to the behavior of the ego-vehicle.

* * * * *